W. E. PAUL

CIRCUIT INTERRUPTING DEVICE

Nov. 24, 1931.

Original Filed Sept. 20, 1929

Re. 18,257

Inventor
William E. Paul,
by Charles E. Mullen
His Attorney.

Reissued Nov. 24, 1931

Re. 18,257

UNITED STATES PATENT OFFICE

WILLIAM E. PAUL, OF SCHENECTADY, NEW YORK, ASSIGNOR TO GENERAL ELECTRIC COMPANY, A CORPORATION OF NEW YORK

CIRCUIT INTERRUPTING DEVICE

Original No. 1,814,847, dated July 14, 1931, Serial No. 394,062, filed September 20, 1929. Application for reissue filed October 2, 1931. Serial No. 566,543.

My invention relates to a circuit interrupting device, and more particularly to contact structure of the fluid-break type wherein pressure developed by an arc is effective to assist in interrupting the current traversing said contact structure.

The interruption of alternating currents, particularly power currents of considerable magnitude, has been attended by difficulty, some of the reasons being that the separating contacts may open at any particular time, as when the current is increasing in value, thereby increasing the persistence of the arc, and that a cooling stream or blast of insulating fluid is not immediately available across the contacts so separated even in the event that the separation is effected at a decreasing or zero current value.

An object of my invention is the provision of an improved circuit interrupter of the fluid-break type wherein pressure generated by arcing is utilized to cause circuit interruption.

A further object of my invention is the provision of means associated with the contacts of a fluid-break switch for effecting separation of cooperating contacts to interrupt an alternating current at substantially the point of zero current value, and for effecting a blast or rapid flow of insulating fluid across the separating contacts in response to the pressure developed by an initial or separate arc.

A further object of my invention is the provision of arc-extinguishing means incorporated in a fluid-break switch wherein initial or opening movement of the switch is effective to produce an arc, the pressure developed by the same being regulated and/or directed so as to move a contact member towards an open circuit position, and to force a body of the insulating fluid between the aforesaid contact member and its cooperating contact.

My invention will be more fully set forth in the following description referring to the accompanying drawings, and the features of novelty which characterize my invention will be pointed out with particularity in the claims annexed to and forming a part of this specification.

Figure 1:
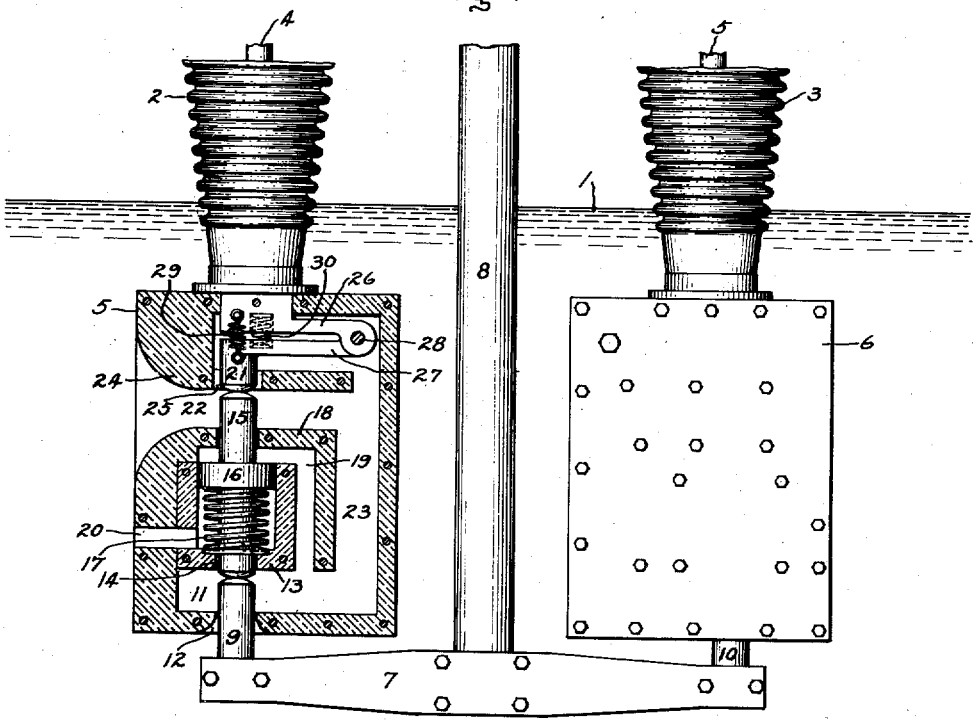
Figure 2:
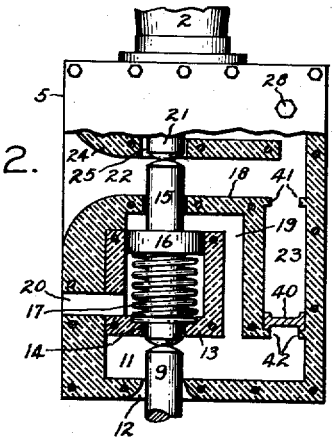

Referring to the accompanying drawings, Fig. 1 is an elevational view, partly in section, of circuit interrupting apparatus embodying my invention, and Fig. 2 is a modification of the structure shown in Fig. 1.

As illustrated in Fig. 1, the contact structure of the switch is immersed in an insulating liquid 1, such as oil for example, and comprises the usual conductor bushings 2 and 3 within which the conductor studs 4 and 5 are disposed. At the lower ends of the bushings 2 and 3 are mounted housing structures 5 and 6 for the contact structure. The usual bridging member 7 actuated by an operating rod 8 carries at its opposite ends the movable contact members, or studs, 9 and 10 which are adapted to extend through the lower part of the respective housing structures.

The housing structures as illustrated in the present instance are composed of a number of sections of insulating material clamped or secured together in any suitable manner, and referring more particularly to the housing structure 5 in section, there is provided a lower pressure chamber 11 into which the contacting end of the stud 9 extends through the opening 12 in the lower wall of the housing. A member 13 comprising the upper wall of the chamber is provided with an opening 14 through which one end of a plunger-like conducting member 15 extends so as to be capable of contacting at one end with the stud 9. The member 15 is provided with a piston element 16 for a purpose hereinafter described and is normally resiliently biased upwardly to the position shown, as by a spring 17 seated at its lower end on the wall member 13. The member 13 includes a vertically extending portion which together with a wall member 18 forms a passage 19 leading from the pressure chamber to the upper working side of the piston element 16. The plunger member 15 extends through and is guided by the member 18 for longitudinal reciprocal movement. A suitable vent opening 20 may be provided in the side wall of the housing communicating with the lower side of the piston element in order that the movement of the member 15 may be regulated by the spring 17.

Cooperating contact structure is mounted in the upper part of the housing and comprises a contact element 21 adapted to be controlled as hereinafter described for contacting with the upper end of the conducting member 15. The point of contact of these members is located within a nozzle-like passage 22 forming an arcing chute and in direct communication with the pressure chamber 11 through the vertically extending passage 23. The upper side of the arcing chute comprises a wall member 24 having an opening 25 within which the contact element 21 may freely move.

The contact element 21 forms a part of a conducting loop comprising the conducting portion 26 connected to the lower end of the stud 4 and a conducting lever 27 connected for relative movement, as by the pivot 28, to the portion 26. The contact element 21 which is mounted at the end of member 27 is resiliently biased, as by a spring 29, towards the compressed position of the loop, i. e., so that the members 26 and 27 are substantially parallel with each other. A resilient member, as the spring 30, may be interposed between members 26 and 27 to serve as shock absorbing or buffer means when the contacting member 15 moves upwardly into engagement with the contact element 21.

As is well known, the magnetic forces of current traversing an open loop tend to cause expansion of the loop, or in other words, current flowing in opposite directions in parallel conductors produces magnetic forces tending to repel the conductors from each other. In the present instance, the current in flowing through the conductor stud 4 and the members 26 and 27 to the contact element 21, tends to repel the member 27 in a counterclockwise direction about its pivot. This repulsion, however, is resisted by the tension spring 29 which may be suitably insulated, or may be of high resistance material, so that it will not shunt an appreciable amount of current. The tension of the spring 29 may be suitably adjusted so that it is effective by itself to maintain the contact element 21 in the position illustrated during minimum values of the current but for higher values of the current it will be overcome by the repellent magnetic forces of the loop.

The operation of the device is as follows:

With the elements in the positions illustrated in the drawings representative of the closed circuit position of the switch, actuation of the rod 8 to lower the movable contact members results in an immediate separation of the lower or pressure generating set of contacts, i. e., contact 9 and the lower contacting portion of the member 15. Since operating currents at comparatively high voltages are involved, an initial arc will be drawn between the contact faces so separated which will immediately develop a pressure within the chamber 11 due to the well known action of the arc on an insulating fluid such as oil. This pressure is communicated at once through the passage 19 to the working side of the piston element 16 to produce a differential pressure on member 15 and to cause depression of the same, the extent of depression being governed to a certain extent by the spring 17. It will be apparent that immediately upon formation of the initial arc, the contacting member 15 is moved by the pressure so created so as to follow the movable contact 9 and to prevent the arc from rapidly increasing in length. In other words, since the gaseous pressure developed by the arc is dependent among other things on the arc length, the regulation of the arc length in the manner above described likewise serves to regulate the pressure developed within the chamber 11 and to prevent it from attaining dangerous values. The arc is therefore automatically regulated by its own pressure.

The pressure developed within the chamber 11 is likewise communicated by way of the vertical passage 23 to the arc chute through which it tends to force a cooling stream or blast of the insulating liquid. As the contacting member 15 moves downwardly to separate the contacts 15 and 21 in response to the pressure developed by the initial arc, the contacting element 21 tends to remain in following engagement therewith until the spring 29 is effective to overcome the repulsion of the magnetic forces in the above described loop. When the current in the loop is at the maximum part of the cycle it will be apparent that interruption at that point is most difficult, and accordingly the contact element 21 is maintained in engagement with its coacting contact surface. When, however, the current decreases to near its minimum value the spring 29 is effective to overcome the magnetic forces of the loop, and accordingly snaps the contact element 21 away from the member 15 at substantially the very time when interruption of the current is most easily accomplished. Concurrently with separation of the set of current interrupting contacts 15, 21, the pressure developed within chamber 11 is effective to shoot a stream of the oil across the break so formed. This serves to interpose a fresh cooling dielectric between the contacting surfaces so as to prevent appreciable dissociation of gases and consequent formation of an arc.

Interruption of the current serves to restore the plunger 15 to its position illustrated in the drawings in which it is biased into good contacting engagement with the contact 21. Closure of the switch is thereupon effected by simply moving the bridging member 7 by its operating rod upwardly to cause engagement of the contacts 9 and 10 with the lower contacting surfaces of the corresponding plunger members.

In the modification illustrated in Fig. 2 the pressure developed by the initial arc instead of expelling both insulating fluid and gases through the arcing chute 22, projects only insulating fluid therethrough. The piston member 40 is floatingly mounted within the passage 23, substantially sealing the same, and is movable between the upper and lower limiting shoulders 41 and 42 respectively. Pressure developed within the chamber 11 forces the piston upwardly to project insulating fluid between the separating contacts. When the pressure in chamber 11 has diminished, the piston is returned by gravity or suitable biasing means to its lower position as illustrated. By this construction the hot gases formed by the initial arc are kept away from the contacts which are to interrupt the current, thereby maintaining high dielectric strength between the same during separation thereof to prevent formation of an arc.

It shall be understood that my invention is not limited to the specific details of construction as illustrated and described, and by way of example, the conducting loop of which the contact 21 forms a part, may comprise any suitable flexible construction capable of operating in the manner described.

What I claim as new and desire to secure by Letters Patent of the United States is:

1. Circuit interrupting apparatus of the fluid-break type comprising relatively movable contacts, means for effecting in response to opening movement of one of said contacts a break for drawing an initial arc, and means for subsequently effecting opening movement of another of said contacts at substantially a minimum current value to form a second break, the pressure developed by the initial arc being effective to force a stream of cooling insulating fluid across the last-named break.

2. Circuit interrupting apparatus of the liquid-break type comprising a movable contact, a conducting member normally in engagement therewith, said contact and conducting member being immersed in an insulating liquid, means resiliently biasing said member away from said contact member, and means for directing the pressure developed by the arc formed upon separation of said contact and said member to cause flow of insulating liquid across a second arc in series therewith to interrupt the circuit, the aforesaid pressure likewise acting on said conducting member against said resilient means to regulate the length of the first-named arc.

3. In a fluid-break switch, contact structure comprising a movable contact, a movable conducting member including a differential piston normally in engagement therewith whereby initial opening movement of the switch is effective to draw an arc between said contact and the conducting member within a pressure chamber, and means for directing the pressure developed by said arc to cause movement of said member towards said contact to prevent excessive lengthening of the arc and to effect flow of insulating fluid across another arc in series with said first-named arc to interrupt the circuit.

4. In a fluid-break switch, contact structure comprising relatively movable contacts, a movable conducting member interposed between said contacts whereby initial opening movement of the switch is effective to draw an initial arc between one of said contacts and the conducting member, said other contact including means for separating the same from the conducting member at a decreasing or zero current value, and means for utilizing the pressure developed by the initial arc to effect a blast of insulating fluid across the break formed between the last-named contact and the conducting member.

5. Circuit interrupting apparatus of the fluid-break type comprising a movable contact, a contact pivotally mounted forming part of a loop traversed by the current to be interrupted, a spring biasing said contact towards compressed position of the loop in opposition to the magnetic forces of said current, a plunger having a piston member interposed between said contacts, said plunger normally resiliently biased towards said pivoted contact, and a pressure chamber within which separation of said movable contact and plunger may take place to cause an initial arc whereby the pressure so developed is effective to move said plunger away from the pivoted contact and to direct a stream of insulating fluid across the break formed therebetween.

6. The combination with a fluid-break switch comprising a movable contact, of means for effecting interruption of current traversing said switch at substantially the minimum current value comprising a contact element forming part of a loop traversed by said current, means biasing said element towards the compressed position of the loop, a conducting member interposed between said movable contact and contact element, and means for utilizing the pressure developed by an arc between the movable contact and conducting member upon initial opening movement of the switch for moving the conducting member away from the contact element and for directing a flow of insulating fluid between the same upon separation thereof, the magnetic forces of the current traversing the aforesaid loop tending to expand the same and to cause the contact element to remain in following engagement with the conducting member until overcome by said biasing means during minimum current value.

7. The combination with a fluid-break switch comprising a movable contact, of means for effecting interruption of current traversing said switch at substantially the minimum current value comprising a contact element forming part of a loop traversed by said current, a spring biasing said element towards the compressed position of the loop in opposition to the magnetic forces of current traversing the same, a conducting member normally resiliently biased into contacting engagement with said element and interposed between the same and the movable contact, and means for utilizing the pressure developed by the arc drawn between the movable contact and conducting member in response to initial opening movement of the switch for moving the conducting member in opposition to its biasing means away from the contact element and for directing a blast of cooling insulating fluid across the arc caused by the separation thereof, said element remaining in following engagement with the conducting member, until retracted by said spring during a minimum current value.

8. In a fluid-break switch, arc-extinguishing means comprising a movable contact, a conducting member in engagement therewith in the closed position of the switch, a contact element coacting with said member, and a pressure chamber within which separation of said movable contact and member may take place to form an arc, the pressure developed by said arc being effective to move said member away from the contact element and towards the movable contact thereby limiting the length of the aforesaid arc and providing substantially constant pressure for directing a blast of insulating fluid between said contact element and conducting member.

9. Circuit interrupting apparatus comprising a housing structure, a plunger-like conducting member mounted for reciprocal movement within said housing, contacts between which said member is disposed, said housing forming a pressure chamber within which separation of one of said contacts and said member may take place, and an arcing chute within which separation of said member and the other of said contacts may take place, said pressure chamber connected by passages with said plunger member and arc-chute for causing in response to pressure developed by an arc within said chamber withdrawal of said member from the last-named contact and a blast of insulating fluid between the same through said arcing chute.

10. The combination with a fluid-break switch, of current interrupting means comprising means for forming an initial arc in response to intial opening movement of the switch, means for effecting separation of contact members of said switch at substantially a minimum current value, and a pressure chamber within which said initial arc is formed whereby the pressure developed thereby is utilized to project insulating fluid between said separating contact members.

11. The combination with a fluid-break switch, of current interrupting means comprising means for forming an intial arc in response to initial movement of the switch, and means responsive to the pressure developed by said arc and to the magnetic forces of current traversing the switch for causing separation of contact members of said switch at substantially a minimum current value, the means actuated by the aforesaid pressure effecting regulation of the length of said arc whereby excessive arcing pressures within said switch are precluded.

12. The combination with a fluid-break switch, of current interrupting means comprising means for forming an initial arc in response to initial opening movement of the switch, a pressure chamber in which said arc is formed, contact members adapted to be separated subsequent to formation of said arc, and a floating piston member interposed between said pressure chamber and contact members whereby the pressure developed by the initial arc is effective to move said piston and project insulating fluid between the separating contact members while precluding gas formed by said arc.

13. A circuit interrupter of the fluid-break type comprising means forming a pressure generating arc in an insulating liquid, a pair of circuit interrupting contacts, and means utilizing the pressure generated by said arc separating said contacts forcing a jet of insulating liquid between the same and extinguishing arcing.

14. A circuit interrupter of the fluid-break type comprising two sets of contacts connected in series immersed in an insulating liquid, one set of contacts forming an initial pressure generating arc in response to circuit opening movement, the pressure generated by said arc forcing apart the other set of contacts causing a blast of insulating liquid between the same extinguishing arcing.

15. A circuit interrupter of the fluid-break type comprising contacts immersed in an insulating liquid, the pressure generated by arcing at said contacts causing interruption of the circuit, and means responsive to said pressure regulating the length of said arc.

16. A circuit interrupter of the fluid-break type comprising a plurality of sets of contacts immersed in an insulating liquid, one set of contacts forming a pressure generating arc, and means responsive to the pressure generated limiting the length of said arc, the pressure generated by said arc interrupting the circuit at another set of contacts.

17. A circuit interrupter of the fluid-break type comprising two sets of contacts connected in series immersed in an insulating liquid, one of said sets forming a pressure generating arc causing separation of the other set of contacts and forcing a jet of insulating liquid therebetween, and means responsive to said pressure generated limiting the length of said arc.

18. A circuit interrupter of the fluid-break type comprising contact structure immersed in an insulating liquid, means forming a pressure generating arc within said liquid, and means responsive to the pressure generated thereby limiting the length of said arc, said pressure causing interruption of the circuit at coacting contacts.

In witness whereof, I have hereunto set my hand.

WILLIAM E. PAUL.